(12) United States Patent
Shiota et al.

(10) Patent No.: US 6,703,162 B2
(45) Date of Patent: Mar. 9, 2004

(54) BATTERY AND PROCESS FOR EXAMINING BATTERY

(75) Inventors: Hisashi Shiota, Tokyo (JP); Hiroaki Urushibata, Tokyo (JP); Shinji Nakadeguchi, Tokyo (JP); Masaharu Moriyasu, Tokyo (JP); Syoji Yoshioka, Tokyo (JP); Hiroiti Ishida, Tokyo (JP); Kiyoshi Hanafusa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 152 days.

(21) Appl. No.: 09/814,701

(22) Filed: Mar. 23, 2001

(65) Prior Publication Data

US 2001/0016279 A1 Aug. 23, 2001

Related U.S. Application Data

(63) Continuation of application No. PCT/JP99/03940, filed on Jul. 23, 1999.

(51) Int. Cl.[7] ............................. H01M 2/08; H01M 6/46
(52) U.S. Cl. ..................... 429/185; 429/162; 429/163; 429/211
(58) Field of Search ............................ 429/185, 163, 429/162, 181, 180, 211, 127, 161

(56) References Cited

U.S. PATENT DOCUMENTS 6,291,098 B1 * 9/2001 Shibuya et al. ............. 429/163

FOREIGN PATENT DOCUMENTS

| JP | 60-211763 | 10/1985 | |
| JP | 62-131469 | 6/1987 | |
| JP | 10106516 | * 4/1998 | ............ H01M/2/02 |
| JP | 10-302756 | 11/1998 | |

* cited by examiner

Primary Examiner—Stephen Kalafut
Assistant Examiner—R Alejandro
(74) Attorney, Agent, or Firm—Oblon, Spivak, McClelland, Maier & Neustadt, P.C.

(57) ABSTRACT

In case of a conventional battery having a laminated sheet material as a battery case for storing a battery body, the metal foil on the laminated sheet does not contact to either a positive electrode or a negative electrode and electric potential is unstable. Therefore, there was a problem that it was impossible to obtain electrical shielding effect. In order to maintain the function of the sealed part in the battery case, an extended part extended from the sealed part is disposed at a position where it overlaps with the positive electrode lead or the negative electrode lead, and by jointing the lead and the extended part with the conductive material piercing therethrough, the metal foil on the laminated sheet material of the battery case is electrically connected to the lead to maintain the electric potential of the battery case to the electric potential of the positive electrode or the negative electrode.

7 Claims, 5 Drawing Sheets

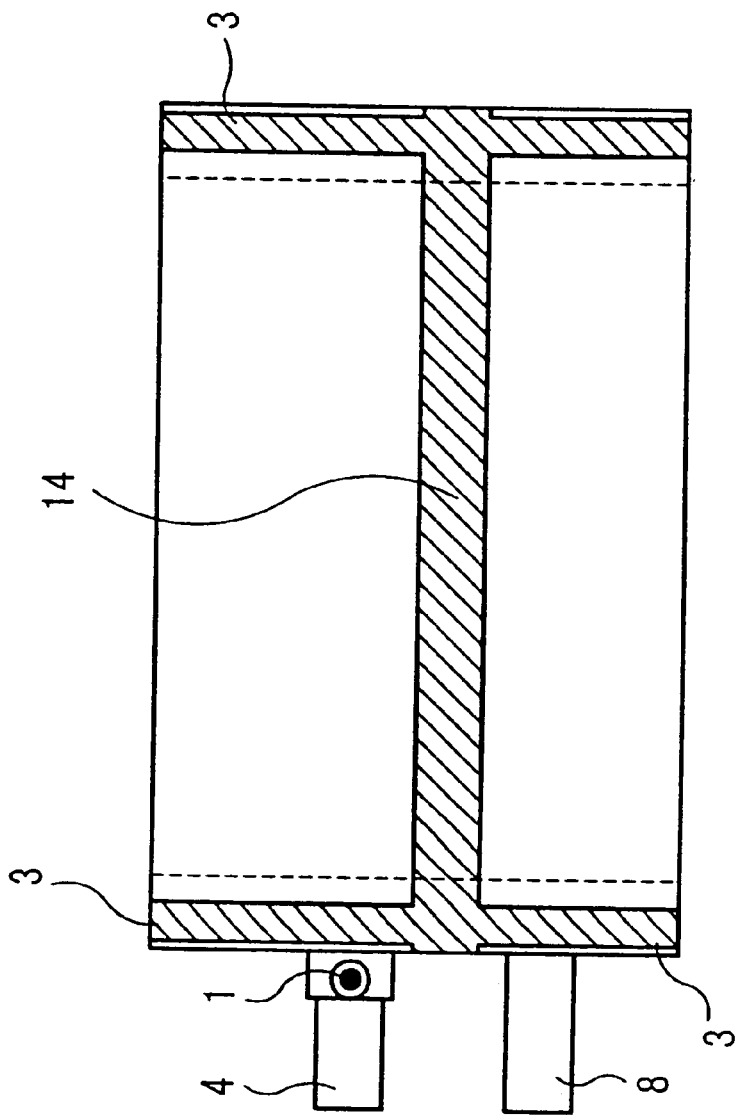

BATTERY AND PROCESS FOR EXAMINING BATTERY

CROSS REFERENCE TO RELATED APPLICATIONS

This application is a continuation of International Application PCT/JP99/03940, which was not published in English filed Jul. 23, 1999.

TECHNICAL FIELD

The present invention relates to lightweight of a battery and a battery having shielding effect and high reliability without sealing leakage.

BACKGROUND ART

There is a growing demand for downsizing and lightening of portable electric appliances and the achievement greatly depends upon improvement of battery performance. There have been development and improvement of various batteries in order to meet the demand. Performance required to a battery includes high voltage, high energy density, safety, variety of shape and the like. As a battery used for portable electric appliances, there are a nickel-cadmium (NiCd) battery, a nickel-hydrogen battery (NiMH) and a lithium ion battery until now. In these batteries, a bundle of a positive electrode, a separator and a negative electrode, which is referred to as a battery body, a battery core or a battery element, is stored in a battery case. A can made of metal such as iron, stainless steel or aluminum has been used for the battery case.

Recently, in case of a battery developed for targeting lightweight, for example, a battery using a unified battery body (a battery element) prepared by jointing a positive electrode, a separator and a negative electrode as disclosed in Japanese Unexamined Patent Publication No. 172606/1998, as the battery case material there is used so-called laminated sheet, which is light weight material and is obtained by laminating a polyethylene film or the like to both surfaces of aluminum foil in order to improve weight energy density.

Usually, when a metal can is used as the battery case, either of the positive electrode or the negative electrode is electrically connected to the battery can. The connection is easy in case of using a metal can. For example, if a metal can of iron or stainless is used for the case of a lithium ion battery, the metal can is electrically connected to the negative electrode, while it is electrically connected to the positive electrode when aluminum is used for the metal can. The reason why the connected electrode is changed depending on the material of the battery can is to prevent the battery from corrosion. Thus, in case of conventional batteries using a metal can, the electric potential of the can is consistent with the electric potential of the positive electrode or the negative electrode. As a result, it expressed an effect of electrically (electromagnetically, electrostatically) shielding the battery element and the electric circuit which provides the battery with electric energy.

However, in case of conventional batteries having a laminated sheet material as a battery case, since the metal foil in the laminated sheet does not contact to either the positive electrode or the negative electrode, electric potential is unstable, and there was a problem that it was impossible to obtain electric shielding effect.

The object of the present invention is to provide a means for surely and easily improving shielding effect of a battery using a laminated sheet material for the battery case.

DISCLOSURE OF INVENTION

The first battery of the present invention comprises; a battery body having a positive electrode, a negative electrode and an electrolytic layer interposed between the positive electrode and the negative electrode; a positive electrode lead electrically connected to the positive electrode; a negative electrode lead electrically connected to the negative electrode; a battery case comprising a laminated sheet obtained by laminating a polymer resin and a metal foil, wherein the battery body is stored and the positive electrode lead and the negative electrode lead are sealed to form a hermetic construction; and a means for electrically connecting the metal foil of the battery case to the positive electrode lead or the negative electrode lead. According to this, it is possible to easily and surely maintain the electric potential of the battery case to the electric potential of the positive electrode or the negative electrode, and to electrically (electromagnetically, electrostatically) shield the battery body and the electric circuit to which the battery is connected.

The second battery of the present invention comprises; a battery body having a positive electrode, a negative electrode and an electrolytic layer interposed between the positive electrode and the negative electrode; a positive electrode lead electrically connected to the positive electrode; a negative electrode lead connected to the negative electrode; an outer lead equipped separately from the positive electrode lead and the negative electrode lead; a battery case comprising a laminated sheet obtained by laminating a polymer resin and a metal foil, wherein the battery body is stored and the positive electrode lead, the negative electrode lead and the outer lead are sealed to form a hermetic construction; and a means for electrically connecting the metal foil of the battery case to the outer lead. According to this, it is possible to maintain the electric potential of the battery body to a desired electric potential by an easy and surely means (by inducing the desired electric potential from outside to the outer lead) and to electrically (electromagnetically, statically) shield the battery body and the electric circuit to which the battery is connected.

The third battery of the present invention is that in the first or second battery, the connecting means has a through hole which pierces through the laminated sheet forming the battery case and the lead, wherein the metal foil of the battery case is electrically connected to the positive electrode lead and the negative electrode lead through a conductive material in contact with the wall surface of the through hole. According to this, electrical shielding can be achieved very easily and surely without any extra space.

The fourth battery of the present invention is that in the first or second battery, the connecting means is set on an extended part, which is extended from the sealing part of the laminated sheet forming the battery case. According to this, sealing effect can be surely maintained even when there is not sufficient space for the sealing part.

The fifth battery of the present invention is that in the first or second battery, the connecting means is a means that an exposing part is formed by exposing a part of the outer surface of the metal foil in the laminated sheet forming the battery case, and the exposing part and the lead are electrically connected. According to this, electrical shielding can be achieved very easily and securely without any extra space.

The first process for examining the battery of the present invention is to compare a voltage between an exposing part and a lead with a voltage between a positive electrode lead and a negative electrode lead, wherein the exposing part is formed by exposing a part of the outer surface of the metal foil in the laminated sheet forming the battery case.

The second process for examining the battery of the present invention is that in the first process, a method for exposing a part of the outer surface of the metal foil is to burn out a polymer resin by means of a laser beam.

The third process for examining the battery of the present invention is that in the first process, a method for exposing the part of the outer surface of the metal foil is to expose the part by pressing a needle probe thereto. According to these first to third processes, it is possible to easily and surely examine properties of electrical shield.

BRIEF DESCRIPTION OF DRAWINGS

FIG. 8a is a plane view showing the form of the side; and

FIG. 8b is a plane view showing a battery according to the fifth embodiment of the present invention.

BEST MODE FOR CARRYING OUT THE INVENTION

The present invention is explained in detail below by means of the embodiments.

Embodiment 1

Figure 1A:
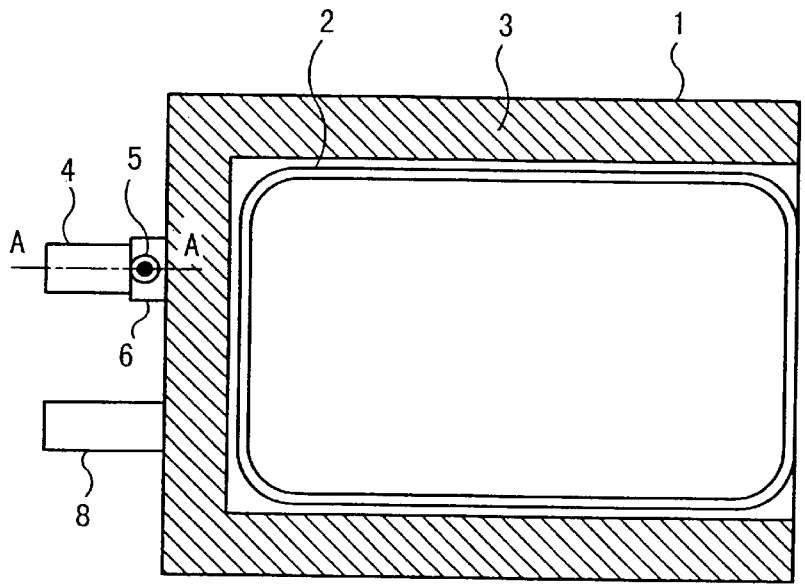
FIG. 1 is a plane view (a) showing a battery according to the first embodiment of the present invention and a partial cross sectional view (b)
Figure 1B:
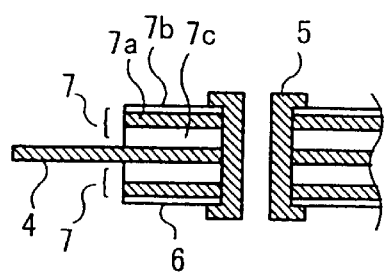

FIG. 1 is a view showing the first embodiment of the battery in the present invention, wherein (a) is a plane view and (b) is a cross sectional view taken on line A—A in (a). In the figure, numeral 1 indicates a battery case made of aluminum laminated sheet. It comprises a storing part 2 for a battery body formed into so-called buttercup shape, a sealing part 3 whose three peripherals are sealed by thermal melting after battery storage in order to form a hermetic construction, an extended part 6 which is extended from the sealing part 3 as a part of the battery case 1, wherein the extended part 6 is formed at the position where the part is overlapped with the positive electrode lead described below. Numeral 4 indicates a positive electrode lead electrically connected to the positive electrode of the battery body. Numeral 5 indicates a connecting means comprising a conductive material piercing the extended part 6 and the positive electrode lead 4. Numeral 7a indicates an aluminum foil of an aluminum laminated sheet 7. Numeral 7b indicates an outer sheet of the aluminum laminated sheet 7a. Numeral 7c is an inner sheet of the aluminum laminated sheet 7a. The conductive material 5 is plugged and the aluminum foil 7a on the extended part 6 is electrically connected to the positive electrode lead 4 through the conductive material 5.

In FIG. 1, what is made of hollow metal is shown as the conductive material 5, but it may be solid. The aluminum foil 7a on the extended part 6 may be electrically connected to the positive electrode lead 4, and various forms may be applied such as the one which is filled with a conductive resin in the conductive material 5 and cured.

The aluminum laminated sheet 7 is formed by laminating a PET (poly(ethylene terephthalate)) sheet as the outer sheet 7b of the aluminum foil 7a, and the PE (polyethylene) layer as the inner sheet 7c. Thickness of the aluminum foil 7a is 20 μm, thickness of the inner sheet 7c is 90 μm, and thickness of the outer sheet 7b is 12 μm.

Figure 2:
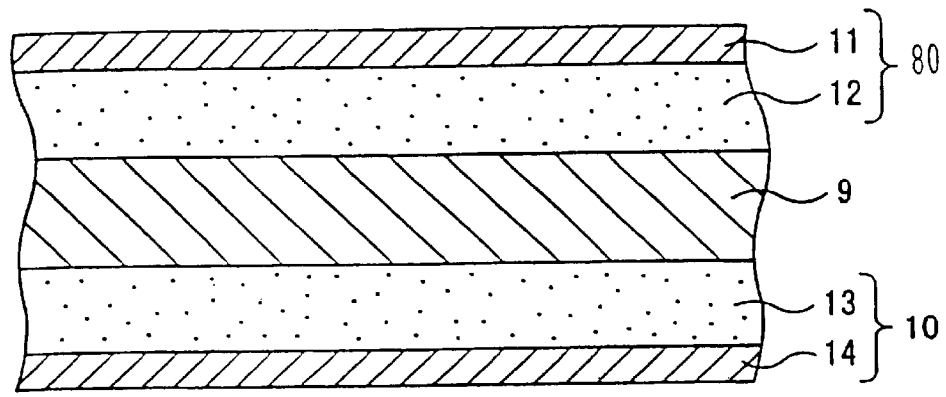
FIG. 2 is a cross sectional view showing a construction of a battery.

FIG. 2 is a cross sectional view showing construction of a battery body, in which numeral 80 is a positive electrode, numeral 9 is an electrolytic layer such as a separator containing an electrolytic solution, numeral 10 is a negative electrode, numeral 11 is a positive electrode current collector, numeral 12 is a positive electrode active material, numeral 13 is a negative electrode active material, and 14 is a negative electrode current collector. The battery case shown in FIG. 1 stores the thus constructed battery body or lamination of a plurality of the battery body to prepare a battery.

As shown in FIG. 1, the extended part 6 which is to be plugged with the positive electrode lead through the conductive material 5 extends outside further than the thermally-melted sealing part 3. Width and length of extension are sufficient, if they are as much as the diameter of the conductive material 5. If they are less than the diameter of the conductive material 5, it is possible to connect to the positive electrode lead 4, but it decrease the possibility that the metal foil in the laminated sheet is in contact with the conductive material 5.

Also, when there is sufficient width for the sealing part 3, the aimed shielding effect for the battery case 1 can be obtained even in case that extension is 0, i.e. the sealing part 3 is driven into the conductive material 5. But when there is no sufficient width for the sealing part 3, there arises a problem of decrease in sealing performance. The diameter of the conductive material 5 is preferably shorter than the width of the lead 4. This is because the conductive material 5 having a longer diameter than the lead width possibly breaks the lead 4.

In this embodiment, the conductive material 5 having diameter of 1.2 mm was used to the lead 4 having width of 3 mm. The through hole, through which the conductive material 5 goes, may be pierced on the lead 4 and the extended part 6 previously or simultaneously by means of driving-in of the conductive material 5. If it is previously pierced, hole diameter is preferably the same as or shorter than the diameter of the conductive material 5. When a through hole larger than the diameter of the conductive material 5 is pierced, it may decrease the possibility that the conductive material 5 is in contact with the lead 4 and metal foil on the extended part 6.

The plug position of the lead 4 and the extended part 6 with the conductive material 5 may be anywhere, as long as the conductive material 5 is in contact with the metal on the lead 4 and the extended part 6. It is preferably positioned on the centerline of the width of the lead 4, since the contact ratio becomes the highest.

As a matter of course, it is preferable to place the extended part 6 at the position where the part is overlapped with the lead 4.

Figure 3:
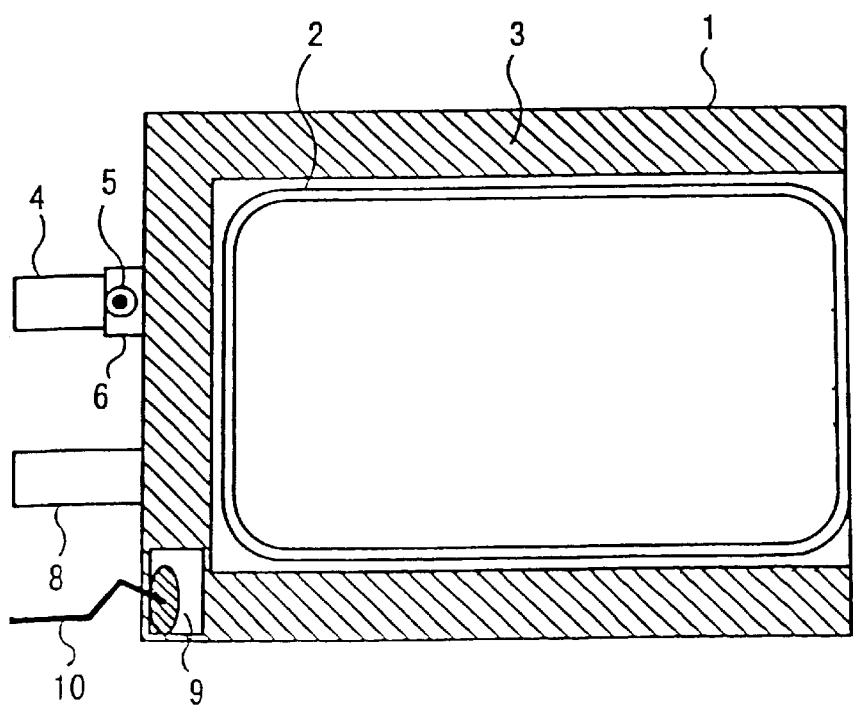
FIG. 3 is a plane view showing testing conditions of the battery according to the first embodiment of the present invention.
Figure 4:
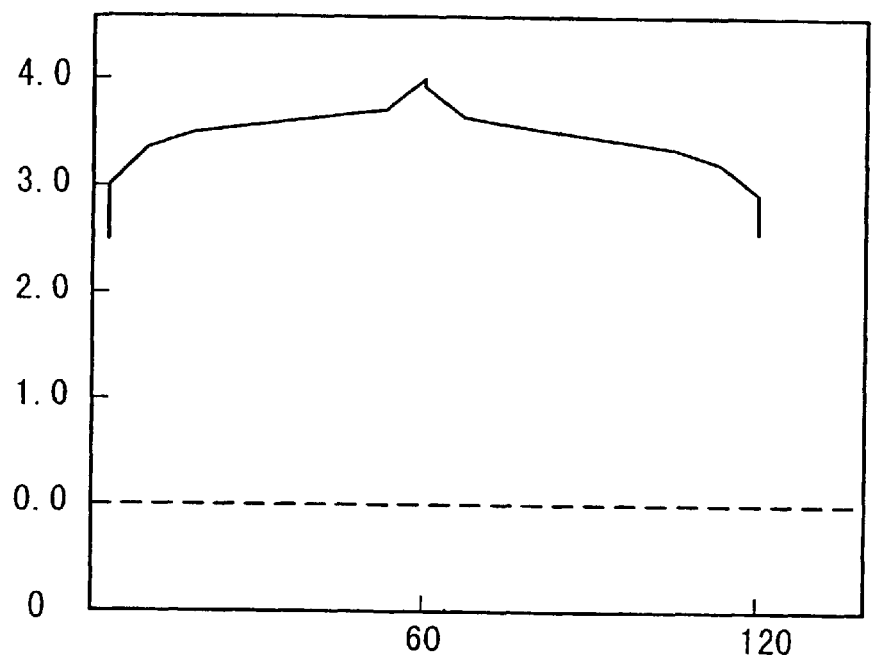
FIG. 4 is the result of voltage variance measurement of the battery according to the first embodiment of the present invention.

As shown in FIG. 3, a part of the PET film is burned out by using a carbon dioxide gas laser to connect a lead wire 10 to the exposed part 9 formed by exposing the aluminum surface. Then a voltage variance was measured between the positive electrode lead 4 and the negative electrode lead 8, and between the positive electrode lead 4 and the lead wire 10. FIG. 4 is a view showing the measurement results. It illustrates the voltage variance between the positive electrode lead 4 and the negative electrode lead 8, and between the positive electrode lead 4 and the lead wire 10 in case of charging and discharging of a battery having a capacity of 500 mAh with constant current of 500 mA. As shown in FIG. 4, the voltage variance between the positive electrode lead 4 and the negative electrode lead 8 showed normal voltage variance and the voltage between the positive electrode lead 4 and the lead wire 10 was constant at 0 V. The result indicates that the battery case has a stable electric potential.

In this embodiment, the positive electrode lead was connected to the aluminum foil of the battery case, but it is better to connect the negative electrode lead in case where a stainless foil is used for the laminated sheet in place of a laminated sheet of aluminum foil. In case where the inner sheet of the battery case material does not have electrochemical ion conductivity, it can be connected to any lead of either electrode.

Embodiment 2

Figure 5:
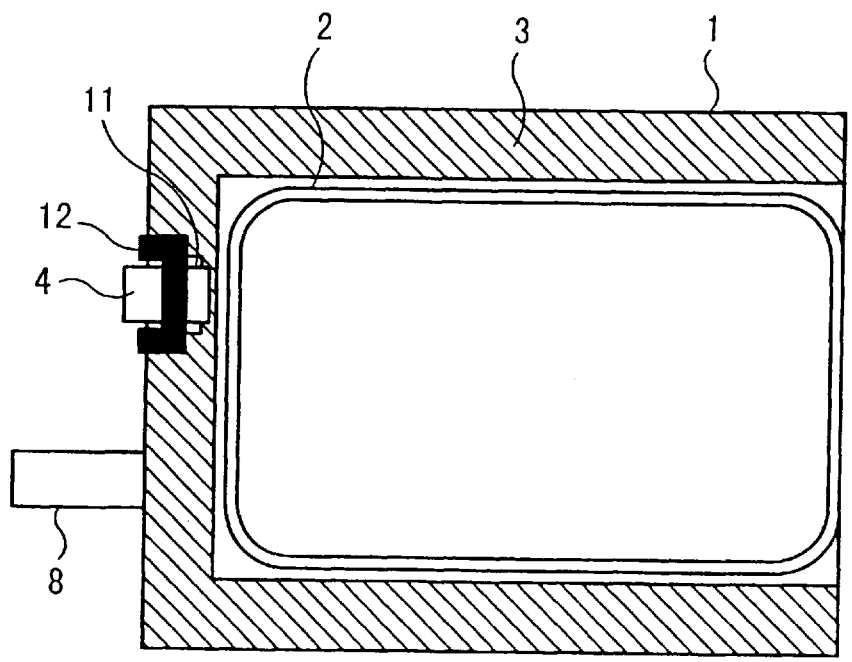
FIG. 5 is a plane view showing a battery according to the second embodiment of the present invention.

FIG. 5 is a plane view showing the second embodiment of the battery of the present invention. In the figure, numeral 11 indicates an exposing part wherein the surface of the aluminum foil is exposed by burning out a PET layer by using a carbon dioxide gas laser, and numeral 12 is a stainless clip. The positive electrode lead 4 was folded in such a way that it was overlapped with the exposing part 11, and was fixed by sandwiching with the clip 12. Burning out of the PET layer was carried out under the conditions shown in Table 1.

A needle prove was stabbed on the surface of the battery case 1 to compare voltage between the probe and the negative electrode lead 8 with voltage between the positive electrode lead 4 and the negative electrode lead 8, and the voltages turned out to be the same. In this way, the fact that the voltage is the same indicates that the aluminum foil on the battery case 1 has the same electrical potential as that of the positive electrode.

TABLE 1

| Kind of laser | Carbon dioxide gas laser |
|---|---|
| Mode | Pulse mode |
| Frequency | 200 Hz |
| Output | 16 W |
| Pulse width | 16 μsec |
| Rate | 1 m/min |
| Spot size | φ 250 mm |

In this embodiment, the lead 4 or 8 was folded and electrically connected to the exposing part. However, there can be employed various connecting means such as application of a conductive paste or fixation of a conductive sheet.

Embodiment 3

Figure 6:
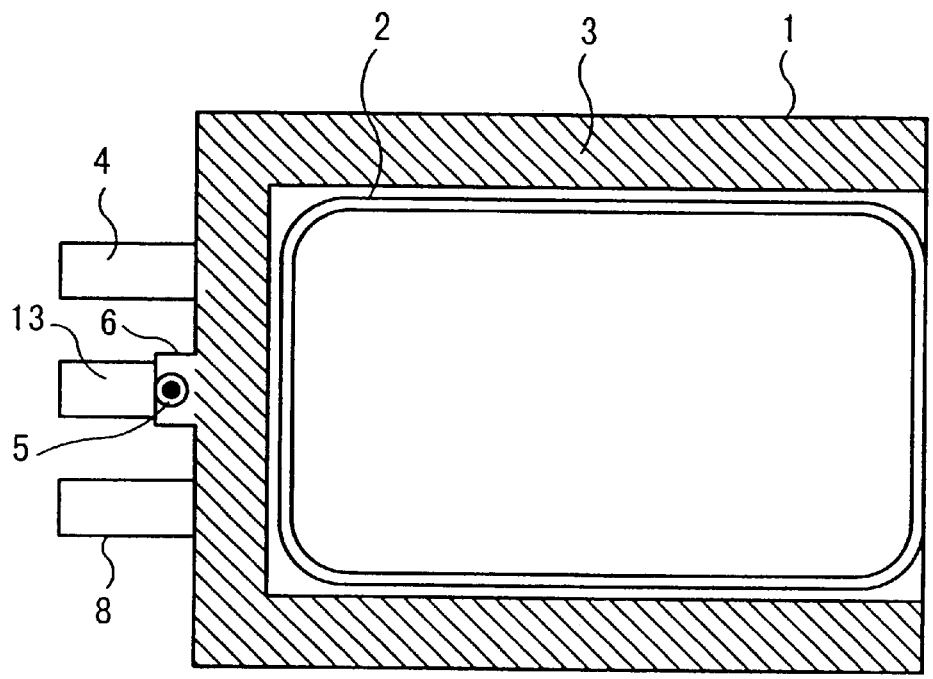
FIG. 6 is a plane view showing a battery according to the third embodiment of the present invention.

FIG. 6 is a cross sectional view showing a battery of the third embodiment in the present invention. In FIG. 6, numeral 13 indicates an outer lead, numeral 6 indicates an extended part extended from the sealing part 3 as a part of the battery case 1, and numeral 5 indicates a conductive material which pierces the extended part 6 and the outer lead 13, wherein the aluminum foil on the extended part 6 is electrically connected to the outer lead 13 through the plugged conductive material 5.

As the battery body, there is used the one having the construction shown in FIG. 2, and as the material for the battery case 1 there is used an aluminum-laminated sheet. The battery case 1 comprises a battery body storing part having a molded part 2 molded into a shape of so-called buttercup which stores the battery body, and a lid laminated to the battery body storing part for hermetic construction, wherein the lid is laminated on the battery body storing part to seal four corners with the sealing part 3.

The aluminum-laminated sheet is obtained by laminating a PET (poly(ethylene terephthalate)) sheet on the exterior of the aluminum foil and the CCP (non-drawn polypropylene) on the interior thereof. Thickness of the aluminum foil is 100 μm, and thickness of the CCP layer is 40 μm, and thickness of the PET layer is 12 μm.

As shown in FIG. 6, the extended part 6 which is to be plugged with the outer lead 13 by using the conductive material 5 extends outside further than the sealing part 3. Width and length of extension is sufficient if they are about diameter of the conductive material 5. The connection with the lead is still possible even if they are at most the diameter of the conductive material, but the possibility of contact between the aluminum foil on the extended part 6 and the conductive material 5 tends to decrease. The diameter of the conductive material 5 is preferably shorter than the width of the outer lead 13. This is because the conductive material 5 having a longer diameter than the outer lead width possibly breaks the lead 13. In this embodiment, the conductive material 5 having diameter of 1.2 mm was used to the outer lead 13 having width of 3 mm. The through hole, through which the extended part 6 goes, may be pierced on the outer lead 13 and the extended part 6 previously or simultaneously with driving-in of the conductive material 5. If it is previously pierced, a hole diameter is preferably the same as or shorter than the diameter of the conductive material 5. When a through hole larger than the diameter of the conductive material 5 is pierced, it may decrease possibility that the conductive material 5 is in contact with the outer lead 13 and metal foil on the extended part 6. The plug position of the outer lead 13 and the extended part 6 through the conductive material 5 may be anywhere, if the conductive material 5 is in contact with the metal on the outer lead 13 and the extended part 6. Preferably, it may be positioned along the centerline of the width of the outer lead 13, since a contact ratio becomes the highest. As a matter of course, it is preferably to place the extended part 6 so as to overlap with the outer lead 13.

In case of so-called four-corner sealing, it is disposed in such a way that the outer lead 13 is in contact with the two positions of the battery body storing side and the lid side, and is plugged by piercing the conductive material 5. When the outer lead 13 is formed separately from the positive and negative leads in this way, it is possible to impart desired electric potential, different from that of the usual positive electrode or the negative electrode, to the battery case 1 by means of an outer circuit through the outer lead 13.

Embodiment 4

Figure 7:
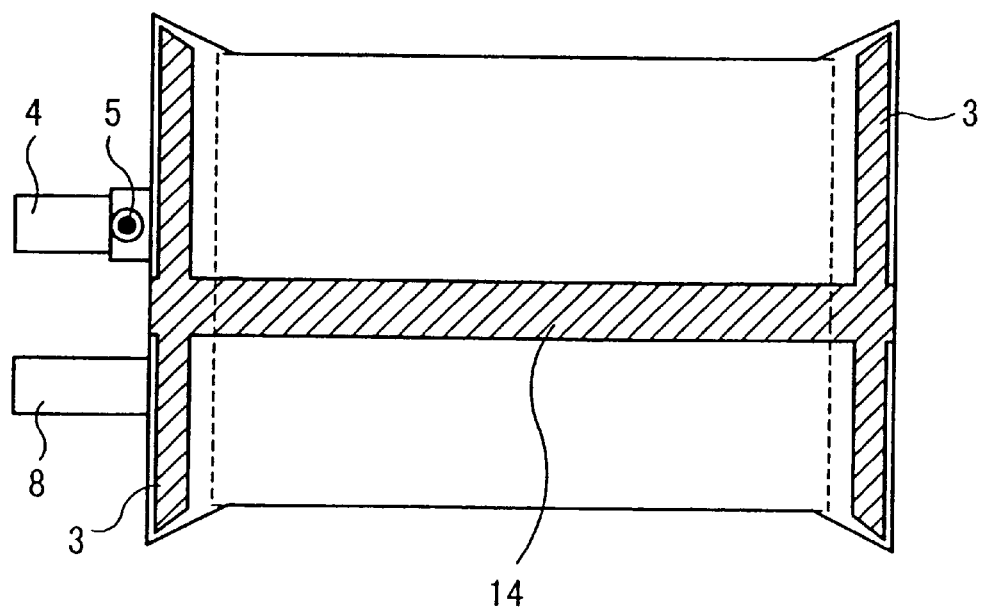
FIG. 7 is a plane view showing a battery according to the fourth embodiment of the present invention.

FIG. 7 shows a battery with a battery case of so-called pillow-shape. The battery is prepared by jointing both edges of an aluminum-laminated sheet (joint 14) to make the aluminum-laminated sheet cylindrical, by storing the battery body inside the cylinder and by sealing the both ends of the cylinder (sealed part 3) to have hermetic construction.

This embodiment shows a battery prepared in the same manner as in Embodiment 1 except that the shape of the battery case is pillow-like as shown in FIG. 6.

Embodiments 2 and 3 are also applicable to the pillow-shaped battery of this embodiment.

Embodiment 5

FIG. 8 is a battery with a battery case whose shape is so-called bottom-lid type, wherein (b) shows a plain view and (a) shows the form of the side. The battery is prepared by jointing both edges of an aluminum-laminated sheet (joint 14) to make the aluminum-laminated sheet cylindrical, by storing the battery body inside the cylinder and by sealing the both ends of the cylinder (sealed part 3) with attaching the bottom lid having a shape shown in FIG. 8(*a*) to have hermetic construction.

This embodiment shows a battery prepared in the same manner as in Embodiment 1 except that the shape of the battery case is bottom-lid type as shown in FIG. 8.

Embodiments 2 and 3 are also applicable to the bottom-lid type battery of this embodiment.

Industrial Applicability

As mentioned above, the battery of the present invention can be used as a power source for mobile phones, radio machines, personal computers and the like, which require electric shielding (electromagnetic shielding or electrostatic shielding).

What is claimed is:

1. A battery comprising;

a battery body having a positive electrode, a negative electrode and a electrolytic layer interposed between the positive electrode and the negative electrode; a positive electrode lead electrically connected to the positive electrode; a negative electrode lead electrically connected to the negative electrode; a battery case comprising a laminated sheet obtained by laminating a polymer resin and a metal foil, in which the battery body is stored, and a hermetic construction is formed by sealing the positive and negative electrode leads; and a means for electrically connecting the metal foil on the battery case to the positive or negative electrode lead.

2. A battery according to claim 1, wherein the connecting means comprises a through hole which pierces through the laminated sheet forming the battery case and the lead, and the metal foil of the battery case is electrically connected to the positive electrode lead or the negative electrode lead through a conductive material in contact with a wall surface of the through hole.

3. A battery according to claim 2, wherein the connecting means is set on an extended part which is extended from the sealing part of the laminated sheet forming the battery case.

4. A battery according to claim 1, wherein the connecting means comprises an exposed part of the outer surface of the metal foil in the laminated sheet forming the battery case and wherein the exposed part and the lead are electrically connected.

5. A battery comprising;

a battery body having a positive electrode, a negative electrode and a electrolytic layer interposed between the positive electrode and the negative electrode; a positive electrode lead electrically connected to the positive electrode; a negative electrode lead electrically connected to the negative electrode; an outer lead equipped separately from the positive and negative electrode leads; a battery case comprising a laminated sheet obtained by laminating polymer resin and a metal foil, in which the battery body is stored, and the positive and negative electrode leads and the outer lead are sealed to form a hermetic construction; and a means for electrically connecting the metal foil of the battery case with the outer lead.

6. A battery according to claim 5, wherein the connecting means comprises a through hole which pierces through the laminated sheet forming the battery case and the lead, and the metal foil of the battery case is electrically connected to one of the positive electrode lead or the negative electrode lead through a conductive material in contact with a wall surface of the through hole.

7. A battery according to claim 5, wherein the connecting means comprises an exposed part of the outer surface of the metal foil in the laminated sheet forming the battery case and wherein the exposed part and the lead are electrically connected.

* * * * *